No. 665,488. Patented Jan. 8, 1901.
F. H. TURNER.
CUSHION TIRE FOR VEHICLE WHEELS.
(Application filed June 25, 1900.)
(No Model.)
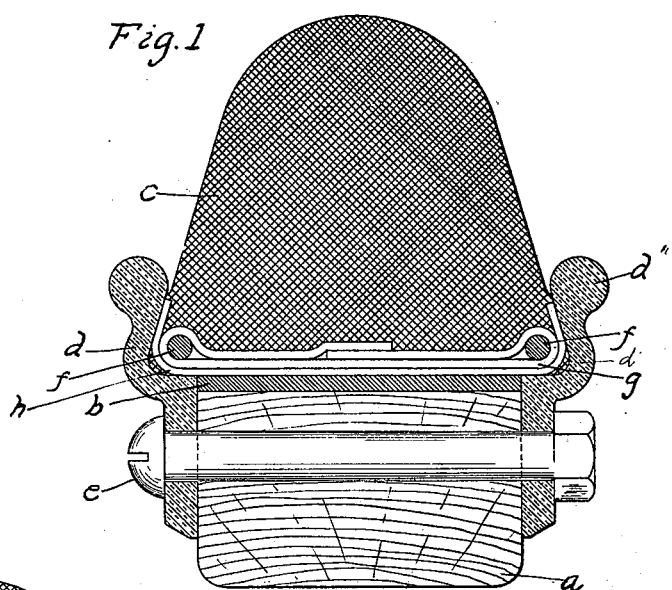
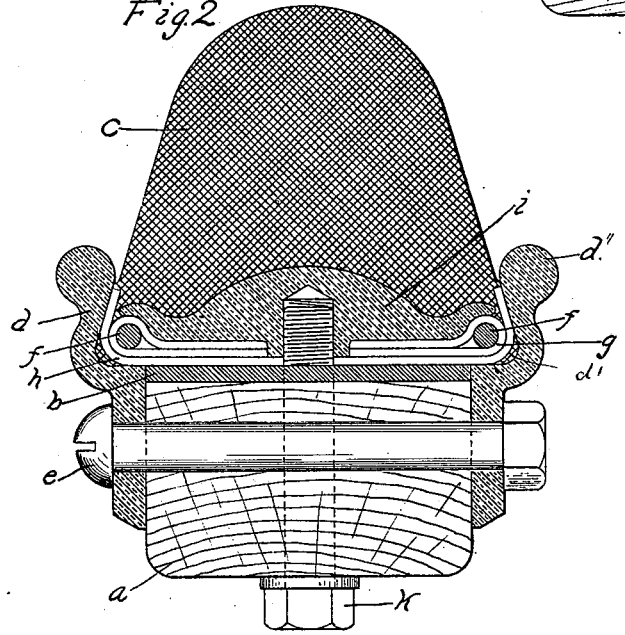
Witnesses
Luitgard Morba
J. E. Dimond
Inventor
Frank H. Turner
By W. E. Simonds
Attorney

UNITED STATES PATENT OFFICE.

FRANK H. TURNER, OF HARTFORD, CONNECTICUT.

CUSHION-TIRE FOR VEHICLE-WHEELS.

SPECIFICATION forming part of Letters Patent No. 665,488, dated January 8, 1901.

Application filed June 25, 1900. Serial No. 21,400. (No model.)

*To all whom it may concern:*

Be it known that I, FRANK H. TURNER, a citizen of the United States of America, residing and having his post-office address at Hartford, in the county of Hartford and State of Connecticut, have invented a certain new and useful Improvement in Cushion-Tires for Vehicle-Wheels, of which the following is a description, reference being had to the accompanying drawings, wherein—

Figure 1 is a view in cross-section of a felly, tire, and appurtenant parts embodying said improvement. Fig. 2 is a view similar to Fig. 1, illustrating a modification. Fig. 3 is a detail endwise view of the extra clamp which forms the main feature of the modification shown in Fig. 2.

The object of the improvement is the production of a tire of an elastic material for a vehicle-wheel, with means for fastening the same to the wheel, having features of novelty and advantage.

In the accompanying drawings the letter $a$ denotes the felly of a wheel or in case there is no felly the body of the wheel.

The letter $b$ denotes a metallic tire which by preference is used on the periphery of the felly—that is, between the felly and the elastic tire, soon to be mentioned.

The letter $c$ denotes a tire of elastic material, that material being usually "rubber," in the common sense of that word. It is an endless tire, made so before it is put upon the wheel. This tire is broadened in shape toward its base.

The letter $d$ denotes what may be called "tire socket-pieces" having flat bodies shaped to fit against the sides of the felly $a$ and the edges of the metallic tire $b$, beyond which said pieces have offsets $d'$ standing substantially at right angles to their bodies, having rounded inner angles to receive the corners of the base of the elastic tire $c$, and beyond which in turn said pieces are continued in arms $d''$, shaped and adapted to fit against the beveled sides of the elastic tire and also so shaped as to compress that tire between them when they are fastened snugly to the sides of the felly.

The letter $e$ denotes bolts for fastening the bodies of the tire socket-pieces snugly against the sides of the felly and in that adjustment grasping and compressing the broadened base of the elastic tire between them.

The letter $f$ denotes endless metallic rods which are fast to the material of the tire along the corners of the base either mediately through the enveloping canvas, yet to be mentioned, or directly in case that canvas be not present.

The letter $g$ denotes heavy canvas enveloping the rods $f$ and fast to the material of the elastic tire. This intimate union between the endless metallic rods and the material of the elastic tire and between the canvas and the material of the elastic tire is brought about by subjecting them together to pressure in molds.

The letter $h$ denotes other canvas spread along the base of the elastic tire and turning up on the sides thereof for a short distance. This canvas is made fast to the whole structure by pressure, as already described.

When the elastic tire is put in place on the wheel, an intimate union between it and its neighboring parts—the metallic tire and the tire socket-pieces—is effected by the use of some proper cement. That which is preferred is shellac, which is afterward dried and solidified by heat. One object of such use of cement is to keep the tire from creeping on the wheel. An additional means for that purpose, as well as for aiding in holding the tire on the wheel, is shown in Figs. 2 and 3. It consists of clamps $i$, distributed at desired and suitable points around the wheel, with their ends overhanging the endless metallic rods. They may be held to place firmly by the screws-pins $k$.

I claim as my improvement—

1. In a cushion-tire for vehicle-wheels, the combination with the felly, and a metallic tire surrounding and of the same breadth as said felly; of an elastic tire broadened in shape toward its base which is wider than said metal tire and superimposed thereon, tire socket-pieces having flat bodies standing against the sides of the felly and the edges of the metal tire, offsets fitting under the corners of the base of said elastic tire, and arms standing against the sides of the same, and bolts passing through the felly and the bodies of said pieces for clamping all parts in relative position, substantially as described.

2. In a cushion-tire for vehicle-wheels, the combination with the felly, and a metal tire surrounding and of the same breadth as the felly; of an elastic tire broadened in shape toward its base which is wider than said metal tire and superimposed thereon, a pair of endless rods within the corners of said base, tire socket-pieces having flat bodies standing against the sides of the felly and the edges of the metal tire, offsets fitting under the corners of the base of said elastic tire, and arms standing against the sides of the same, and bolts passing through the felly and the bodies of said pieces for clamping all parts in relative position, substantially as described.

3. In a cushion-tire for vehicle-wheels, the combination with the felly, and a metal tire surrounding and of the same breadth as the felly; of an elastic tire broadened in shape toward its base which is wider than said metal tire and superimposed thereon, a pair of endless rods within the corners of said base, a canvas strip enveloping the rods and attached to the material of such base, tire socket-pieces having flat bodies standing against the sides of the felly and the edges of the metal tire, offsets fitting under the corners of the base of said elastic tire, and arms standing against the sides of the same, and bolts passing through the felly and the bodies of said pieces for clamping all the parts in relative position, substantially as described.

4. In a cushion-tire for vehicle-wheels, the combination with the felly, and a metal tire surrounding and of the same breadth as said felly; of an elastic tire broadened in shape toward its base which is wider than said metal tire and superimposed thereon, a pair of endless rods within the corners of said base, a canvas strip enveloping the rods and attached to the material of such base, a second canvas strip interposed directly between the first canvas strip and said metallic tire and turned up at its edges on the sides of the elastic tire and cemented thereto, tire socket-pieces having flat bodies standing against the sides of the felly and the edges of the metal tire, offsets fitting under the corners of the base of said elastic tire, and arms standing against the sides of the same, and bolts passing through the felly and the bodies of said pieces for clamping all parts in relative position, substantially as described.

5. In a cushion-tire for vehicle-wheels, the combination with the felly, and a metal tire surrounding and of the same breadth as said felly; of an elastic tire broadened in shape toward its base which is wider than said metal tire and superimposed thereon, a pair of endless rods within the corners of said base, means for holding them in place therein, clamps disposed at intervals around the felly with their ends overhanging such rods, pins extending radially through the felly and engaging the centers of such clamps, tire socket-pieces having flat bodies standing against the sides of the felly and the edges of the metal tire, offsets fitting under the corners of the base of said elastic tire, and arms standing against the sides of the same, and bolts passing through the felly and the bodies of said pieces for clamping all parts in relative position, substantially as described.

FRANK H. TURNER.

Witnesses:
EDWARD M. YEOMANS,
LUITGARD MORBA.